United States Patent [19]

Schora

[11] Patent Number: 5,185,220
[45] Date of Patent: Feb. 9, 1993

[54] FUEL CELL CLAMPING FORCE EQUALIZER

[75] Inventor: Frank C. Schora, Palatine, Ill.

[73] Assignee: M-C Power Corporation, Burr Ridge, Ill.

[21] Appl. No.: 782,502

[22] Filed: Oct. 25, 1991

[51] Int. Cl.⁵ .............................................. H01M 2/08
[52] U.S. Cl. ...................... 429/35; 429/36; 429/37
[58] Field of Search ............................ 429/35, 36, 37

[56] References Cited

U.S. PATENT DOCUMENTS

| | | |
|---|---|---|
| 2,925,456 | 2/1960 | Beusker et al. . |
| 3,404,041 | 10/1968 | Inami . |
| 3,647,554 | 3/1972 | Arrance et al. . |
| 3,703,417 | 11/1972 | Rosa et al. . |
| 4,064,321 | 12/1977 | Grehier . |
| 4,225,654 | 9/1980 | Tajima et al. . |
| 4,400,447 | 8/1983 | Gerenser et al. . |
| 4,514,475 | 4/1985 | Mientek ........................... 429/35 |
| 4,543,303 | 9/1985 | Dantowitz et al. . |
| 4,604,331 | 8/1986 | Louis . |
| 4,609,595 | 9/1986 | Nickols . |
| 4,687,717 | 8/1987 | Kaun et al. . |
| 4,689,280 | 8/1987 | Gionfriddo . |
| 4,874,678 | 10/1989 | Reichner . |
| 4,963,442 | 10/1990 | Marionowski et al. ............... 429/13 |
| 4,973,531 | 11/1990 | Zaima et al. . |
| 5,077,148 | 12/1991 | Schora et al. ........................ 429/16 |

Primary Examiner—Olik Chaudhuri
Assistant Examiner—M. Nuzzolillo
Attorney, Agent, or Firm—Speckman & Pauley

[57] ABSTRACT

A clamping force equalizer for use in a generally rectangular fuel cell stack comprising two sheets of flexible metal sealed together at their edges and an electrically conductive material disposed between said sheets of flexible metal, said electrically conductive material being in a liquid state at a fuel cell operating material. The clamping force equalizer in accordance with this invention has a length and a width equivalent to the length and width of a horizontal plane of the fuel cell stack such that equalization of the clamping force applied to the fuel cell stack occurs over the entire horizontal plane of the fuel cell stack.

20 Claims, 1 Drawing Sheet

FUEL CELL CLAMPING FORCE EQUALIZER

BACKGROUND OF THE INVENTION

1. Field of the Invention

This invention relates to an apparatus and process for equalizing the clamping force applied to a fuel cell stack, in particular, fully internally manifolded molten alkali metal carbonate fuel cell stacks.

Generally, a fuel cell stack is comprised of a stacked plurality of individual fuel cell units separated by inert or bipolar ferrous metal separator plates. Individual cells are sandwiched together and secured into a single stacked unit to achieve desired fuel cell energy output. Each individual fuel cell unit generally includes an anode and cathode electrode, a common electrolyte tile, and a fuel and oxidant gas source. Both fuel and oxidant gas are introduced through manifolds to their respective reactant chambers between the separator plate and the electrodes.

In the manufacture of the individual components of the fuel cell units, variations do occur in the thicknesses of the components, which variations would be expected to occur during the normal manufacturing process. In fuel cell stacks having a relatively small cross sectional area, one square foot or less, compensation for such nonuniformity is generally accomplished by selection and orientation of the components such that variations in thickness can generally be matched to produce a uniform fuel cell stack height. However, in fuel cell stacks with greater horizontal cross section and vertical height, as is necessary to obtain commercially practical fuel cell stacks, this matching of so called "highs and lows" in various components becomes a very difficult, if not impossible task, even when such variations are within manufacturing tolerance.

This invention provides an electrically conducting vertical force equalizer which may be used in any number required within the fuel cell stack itself to compensate for the small vertical dimensional differences across the horizontal plane of the fuel cell stack to reduce internal electrical resistance caused by contact between cell stack components.

2. Description of the Prior Art

Commercially viable molten carbonate fuel cell stacks may contain up to about six hundred individual fuel cell units, each having a planar area in the order of eight square feet. Such fuel cell stacks can be approximately ten feet tall presenting serious problems in the application of a clamping force necessary to force the individual fuel cell units and their respective components together. Due to the thermal gradients between cell assembly and cell operating conditions, differential thermal expansions, and the necessary strength of materials used for the various fuel cell components, close tolerances are required. However, even when the components are manufactured within the required closed tolerances, variations in component thickness inevitably occur. One apparent solution to the problems associated with variations in thickness of the fuel cell unit components is taught by U.S. Pat. No. 4,689,280 in which end plate resilience to a fuel cell stack is provided by a combination flat and corrugated plate structure which make up a "dummy" cell adjacent the end plates. The structure relies solely upon the mechanical resilience provided by the cooperation of the flat and corrugated plate and only suggests that such structures be internally adjacent to the end plates. U.S. Pat. No. 4,973,531 teaches a hollow body filled with air and/or oil external to rigid cell holders to apply even pressure to the external side of the rigid cell holders as the cell is heated to operating temperature.

Other attempts to solve the problems associated with varying thicknesses of cell components are focused only on the edges of the fuel cell components. Resilient edge sealing flanges are taught by U.S. Pat. No. 4,609,595 and 4,514,475 which teach flat and corrugated type spring sheets within hollow sealing flanges rendering compressible sealing flanges to accommodate tolerances in thicknesses of cell components and U.S. Pat. No. 4,604,331 which teaches bellow type edge sealing flanges which may have internal mechanical means to increase their stiffness, to maintain sealing integrity by the resilience of the sealing flanges.

Other known prior art which may affect the compression of a fuel cell stack include U.S. Pat. No. 4,874,678 which teaches solid oxide electrolyte cell stacks with metal fiber felt shock absorbent between the cells; U.S. Pat. No. 4,687,717 which teaches a lithium/iron sulfide battery with hollow separator plates having solid particle or fiber internal support material; U.S. Pat. No. 2,925,456 which teaches hollow electric accumulator separators having internal reinforcement to maintain their shape; U.S. Pat. No. 3,703,417 which teaches hot sealed flexible envelope separators for batteries; U.S. Pat. No. 3,404,041 which teaches an impregnated fibrous battery separator; U.S. Pat. No. 3,647,554 which teaches a flexible film applied to a rigid separator for batteries; U.S. Pat. No. 4,225,654 which teaches fuel cell separators of elastic synthetic material, such as synthetic rubber; U.S. Pat. No. 4,064,321 which teaches fuel cell separators of thin sheets of polyvinyl chloride having internal compartments filled with gas and orifices for ionic conduction between electrodes; U.S. Pat. No. 4,543,303 which teaches a water/gas separator to separate product water and exhaust oxidant in each cell by using a microporous valve metal structure; and U.S. Pat. No. 4,400,447 which teaches a consumable anode cell having a combined current collector and separator.

SUMMARY OF THE INVENTION

It is an object of this invention to provide a process and apparatus which compensates for small vertical dimensional differences across the entire horizontal plane of a fuel cell stack to allow for uniform vertical force throughout the stack to reduce internal electrical resistance.

It is another object of this invention to provide an apparatus and process for vertical force equalization which is electrically conducting and which may be used in any number required within the fuel cell stack itself.

It is another object of this invention to provide a process and apparatus for vertical force equalization of a fuel cell stack which is suitable for use with an internal manifolded fuel cell stack.

It is yet another object of this invention to provide an apparatus for vertical force equalization suitable for use as a separator plate in a fuel cell stack.

These objects are achieved in accordance with this invention in a generally rectangular fuel cell stack comprising a plurality of fuel cell units, each fuel cell unit comprising an anode and a cathode, an electrolyte in contact with one side of the anode and the opposite facing side of the cathode, and a separator plate separating the fuel cell units between the anode and cathode forming an anode chamber between one side of the separator plate and the anode and a cathode chamber between the opposite side of the separator plate and the cathode. The fuel cell units are disposed between two end plates. Inserted into the fuel cell stack is a fuel cell clamping force equalizer to compensate for small vertical dimensional differences across a horizontal plane of the fuel cell stack. The fuel cell clamping force equalizer comprises two sheets of flexible metal sealed together at their edges and having a length and a width equivalent to the length and width of a horizontal plane of the fuel cell stack, forming a pillow-like structure. Disposed between the two sheets of flexible metal is an electrically conductive material which is in a liquid state at the operating temperature of a fuel cell, between about 500° C. and about 700° C. Such electrically conductive material is preferably a metal, metal alloy and mixtures thereof. In this way, the liquid electrically conductive material between the thin flexible sheets is able to distribute an equal force over the entire surface area of the equalizer. In addition, because the liquid electrically conductive metal is a good electrical conductor, little or no measurable resistance to vertical current flow through the stack is created by insertion of the equalizer into the stack.

In a preferred embodiment of this invention particularly suited for use in internal manifolded fuel cells, the sheets of flexible metal are provided with at least one perforation, preferably a perforation in each corner area, which perforation aligns with corresponding perforations in the separator plates and electrolytes of the fuel cell stack. The sheets of flexible metal are sealed at the periphery of each of the perforations, thereby insuring retention of the electrically conductive material between the sheets of flexible metal during operation of the fuel cell.

In accordance with another embodiment of this invention, the sheets of flexible metal, sealed at their edges by bellow means for expanding and contracting the ends of the pillow-like structure and having an electrically conductive material disposed therebetween, are provided with distribution ribs and function as a separator plate separating the fuel cell units between the anode and the cathode.

To equalize the clamping force applied to a fuel cell stack to compensate for small vertical dimensional differences across a horizontal plane of the fuel cell stack, a force equalization means for adjusting to a variation in a thickness of the fuel cell stack while maintaining a uniform vertical force across the horizontal plane on all components of the fuel cell stack comprising two sheets of flexible metal sealed at their edges and having a length and a width equivalent to the length and width of the horizontal plane of the fuel cell stack with an electrically conductive material disposed therebetween, which electrically conductive material is in a liquid state at the operating temperature of the fuel cell, is inserted entirely between the end plates of the fuel cell stack. The components of the fuel cell stack together with the force equalization means are vertically clamped together to produce a uniform clamping force across the entire horizontal plane of the fuel cell stack.

BRIEF DESCRIPTION OF THE DRAWINGS

Further features of this invention will be apparent from the following detailed description of the invention read in conjunction with the drawings, wherein.

DESCRIPTION OF PREFERRED EMBODIMENTS

Figure 1:
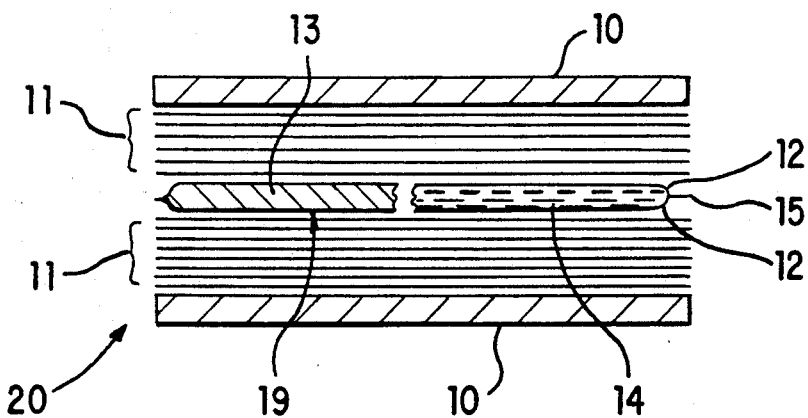
FIG. 1 is a schematic diagram of a side view of a fuel cell stack showing the clamping force equalizer within the stack.

FIG. 1 shows clamping force equalizer 19 in accordance with one embodiment of this invention disposed between fuel cell stack elements 11 and fuel cell end plates 10. Fuel cell stack elements 11 include an anode, a cathode, an electrolyte in contact with one side of the anode and an opposite facing side of the cathode, and a separator plate separating each fuel cell unit within the fuel cell stack between the anode and the cathode, forming an anode chamber between one side of the separator plate and the anode and a cathode chamber between the opposite side of the separator plate and the cathode. Although only one clamping force equalizer 19 is shown within fuel cell stack 20, more than one clamping force equalizer 19 may be used within a single fuel cell stack 20 to compensate for the varying thicknesses of stack elements 11 throughout fuel cell stack 20.

Clamping force equalizer 19 comprises two sheets of thin flexible metal 12, preferably stainless steel, sealed together at their edges 15 and having a length and a width equivalent to the length and width of a horizontal plane of fuel cell stack 20. The sheets of thin flexible metal 12 sealed together at their edges 15 form a pillow-like structure. Sealed within the pillow-like structure is an electrically conductive material 13, 14 which is in a liquid state 14 at the operating temperature of the fuel cell. The electrically conductive material is in a solid state 13 at temperatures below the operating temperature of fuel cell stack 20.

Electrically conductive material 13, 14 may be any metal, metal alloy and mixtures thereof which is in a solid state below the operating temperature of fuel cell stack 20 and in a liquid state at the operating temperature of fuel cell stack 20. The preferred electrically conductive material 13, 14 is lead. The operating temperature of fuel cell stack 20 is preferably between about 500° C. and about 700° C.

Figure 2:
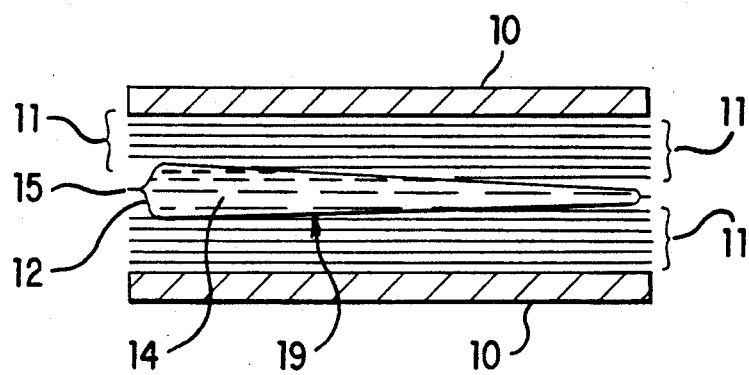
FIG. 2 is a schematic diagram of a side view of a fuel cell stack in which the clamping force equalizer according to this invention is shown compensating for unevenness of stack elements within the fuel cell stack.

FIG. 2 shows the manner in which clamping force equalizer 19 compensates for unevenness of stack elements 11 in fuel cell stack 20. As end plates 10 are clamped together around fuel cell stack elements 11 and clamping force equalizer 19, electrically conductive material 13, 14 which is in a liquid state is distributed within the pillow-like structure formed by the sheets of thin flexible metal 12 to compensate for unevenness in fuel cell stack 20 as end plates 10 are clamped together.

Figure 3:
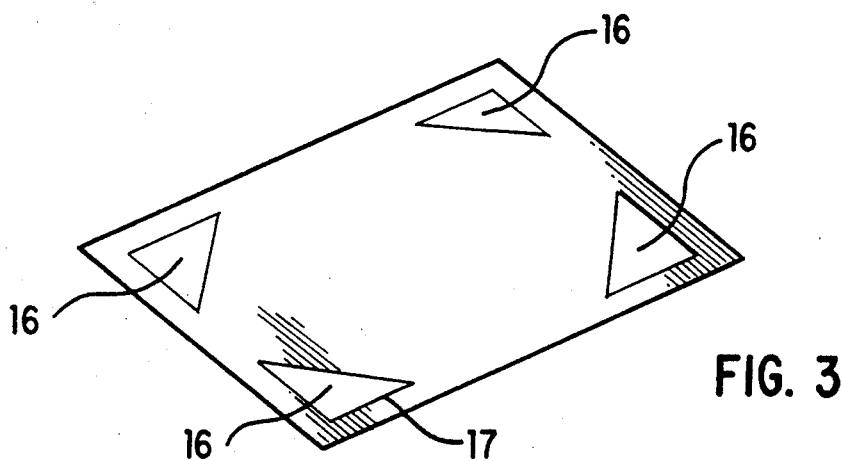
FIG. 3 is a perspective top view of the clamping force equalizer in accordance with one embodiment of this invention.

In a particularly preferred embodiment of this invention as shown in FIG. 3, equalizer 19 is provided with a perforation 16 in each corner area and sealed at the periphery 17 of each said perforation. Perforation 16 is configured to align with corresponding perforations in other stack elements 11, such as the separator plates and electrolytes forming an internal manifold for distribution of fuel and oxidant to the individual fuel cell units of fuel cell stack 20.

Figure 4:
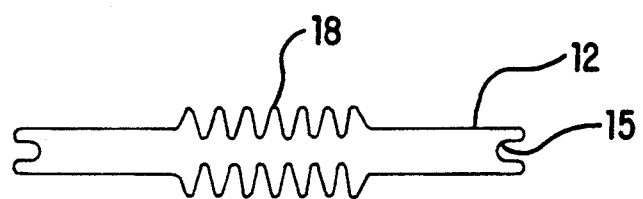
FIG. 4 is a side view of the clamping force equalizer in accordance with one embodiment of this invention.

In accordance with yet another embodiment of this invention, clamping force equalizer 19 comprises sheets of thin flexible metal 12 in the form of thin, flexible metal plates having distribution ribs 18 as shown in FIG. 4, forming separator plates whereby one side of clamping force equalizer 19 acts as an oxidant distributor and the other side acts as a fuel distributor for a fuel cell stack 20. The edges of sheets of thin flexible metal 12 are sealed together by bellow means 15 for expansion and contraction of the edge regions of the pillow-like structure. Suitable bellow means in accordance with one embodiment of this invention comprise a C-shaped, resilient member connected between the edges of the sheets of thin flexible metal 12 and sealing the edges of the sheets of thin flexible metal 12 together. Suitable bellow means in accordance with another embodiment of this invention comprise an accordion-pleated, resilient member connected between the edges of the sheets of thin flexible metal 12, sealing the edges together. It will be apparent to those skilled in the art that there are several possible structural members other than those described hereinabove which would be suitable for providing expansion and contraction of the edge regions of the sheets of thin flexible metal 12. To effect a seal between the edge regions of thin flexible metal sheets 12 in accordance with this embodiment of this invention and other components comprising fuel cell stack elements 11, thin flexible metal sheets 12 are provided with sealing means along the edges on the face of thin flexible metal sheets 12 facing outward from the pillow-like structure formed by thin flexible metal sheets 12. Suitable sealing means may be the wet seal in accordance with the teachings of U.S. Pat. No. 4,963,442.

In accordance with another embodiment of this invention, clamping force equalizer 19 when functioning as a separator plate is flat on one side rather than having distribution ribs 18 on both sides so that it may be located adjacent to end plate 10.

In accordance with yet another embodiment of this invention, clamping force equalizer 19 in the form of a separator plate is provided with a perforation 16 in each corner area and sealed at the periphery 17 by bellow means 15 to permit expansion and contraction of the periphery 17 as necessary to equalize the fuel cell clamping force across the entire horizontal plane of fuel cell stack 20.

It is important to note that clamping force equalizer 19 in accordance with this invention is capable of compensating for variations within fuel cell stack 20 across the entire horizontal plane of fuel cell stack 20. In addition, more than one clamping force equalizer 19 may be used within a single fuel cell stack 20.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a generally rectangular fuel cell stack comprising a plurality of fuel cell units, each said fuel cell unit comprising an anode and a cathode, an electrolyte in contact with one side of said anode and with an opposite facing side of said cathode, and a separator plate separating said fuel cell unit between said anode and said cathode forming an anode chamber between one side of said separator plate and said anode and a cathode chamber between the opposite side of said separator plate and said cathode, said fuel cell units disposed between two endplates, the improvement comprising:

two flexible metal sheets, sealed together at their edges and disposed between said endplates, said flexible metal sheets having a length and a width equivalent to a horizontal plane length and a horizontal plane width of a horizontal plane of said fuel cell stack; and an electrically conductive material selected from the group consisting of metals, metal alloys and mixtures thereof disposed between said flexible metal sheets, said electrically conductive material being in a liquid state at a fuel cell operating temperature.

2. In a fuel cell stack in accordance with claim 1, wherein said fuel cell operating temperature is between about 500° C. and about 700° C.

3. In a fuel cell stack in accordance with claim 1, wherein said separator plates, said electrolytes and said flexible metal sheets each have at least one aligned perforation, said flexible metal sheets sealed at the periphery of each said perforation.

4. In a fuel cell stack in accordance with claim 1, wherein said flexible metal sheets are constructed of stainless steel.

5. In a fuel cell stack in accordance with claim 1, wherein said electrically conductive material is lead.

6. In a fuel cell stack in accordance with claim 1, wherein said flexible metal sheets are provided with distribution ribs and form a separator plate separating said fuel cell units between said anode and said cathode.

7. In a fuel cell stack in accordance with claim 6, wherein said edges of said flexible metal sheets are sealed together by bellow means for enabling expansion and contraction along said edges, said bellow means disposed between said edges of said flexible metal sheets.

8. A fuel cell clamping force equalizer for a fuel cell stack to compensate for small vertical dimensional differences across a horizontal plane of said fuel cell stack comprising:

two flexible metal sheets sealed together at their edges and disposed between two endplates of said fuel cell stack, said flexible metal sheets having a length and a width equivalent to a horizontal plane length and a horizontal plane width of a horizontal plane of said fuel cell stack; and an electrically conductive material selected from the group consisting of metals, metal alloys and mixtures thereof disposed between said flexible metal sheets, said material being in a liquid state at a fuel cell operating temperature.

9. A fuel cell clamping force equalizer in accordance with claim 8, wherein at least one of said flexible metal sheets has a plurality of distribution ribs.

10. A fuel cell clamping force equalizer in accordance with claim 8, wherein said fuel cell operating temperature is between about 500° C. and about 700° C.

11. A fuel cell clamping force equalizer in accordance with claim 8, wherein said flexible metal sheets each have at least one aligned perforation, said flexible metal sheets sealed at the periphery of each said perforation.

12. A fuel cell clamping force equalizer in accordance with claim 8, wherein said flexible metal sheets are constructed of stainless steel.

13. A fuel cell clamping force equalizer in accordance with claim 8, wherein said electrically conductive material is lead.

14. A process for equalizing the clamping force applied to a fuel cell stack to compensate for small vertical dimensional differences across a horizontal plane of said fuel cell stack, said fuel cell stack comprising a plurality of fuel cell units, each said fuel cell unit comprising an anode and a cathode, an electrolyte in contact with one side of said anode and with an opposite facing side of said cathode, and a separator plate separating said fuel cell unit between said anode and said cathode forming an anode chamber between one side of said separator plate and said anode and a cathode chamber between the opposite side of said separator plate and said cathode, said fuel cell units disposed between two endplates, comprising:

inserting entirely between said endplates of said fuel cell stack a force equalization means for adjusting to a variation in a thickness of said fuel cell stack while maintaining a uniform vertical force across said horizontal plane on all components of said fuel cell stack; and vertically clamping said components of said fuel cell stack and said force equalization means together.

15. The process in accordance with claim 14, wherein said force equalization means comprises two flexible metal sheets sealed together at their edges, said flexible metal sheets having a length and a width equivalent to a horizontal plane length and a horizontal plane width of said horizontal plane of said fuel cell stack and an electrically conductive material selected from the group consisting of metals, metal alloys and mixtures thereof disposed between said flexible metal sheets, said material being in a liquid state at a fuel cell operating temperature.

16. A process in accordance with claim 15, wherein at least one of said flexible metal sheets has a plurality of distribution ribs.

17. A process in accordance with claim 15, wherein said fuel cell operating temperature is between about 500° C. and about 700° C.

18. A process in accordance with claim 15, wherein said flexible metal sheets each have at least one aligned perforation, said flexible metal sheets sealed at the periphery of each said perforation.

19. A process in accordance with claim 15, wherein said flexible metal sheets are constructed of stainless steel.

20. A process in accordance with claim 15, wherein said electrically conductive material is lead.

* * * * *